United States Patent [19]
Ducharme et al.

[11] Patent Number: 4,881,490
[45] Date of Patent: * Nov. 21, 1989

[54] ABSORBENT COMPOSITION, AND METHOD OF MAKING SAME

[76] Inventors: Cyril L. Ducharme, 3405 High Ln., Long Lake, Minn. 55356; Ralph C. Eickhof, Union Lake, Erskine, Minn.; David A. Heider, 776 Fairmount Ave., St. Paul, Minn. 55105; Denny W. Neiberger, 5238 Holiday Rd., Minnetonka, Minn. 55345; Fred Maass, 856 Carpenter St., Oak Park, Ill. 60134

[*] Notice: The portion of the term of this patent subsequent to Jul. 4, 2006 has been disclaimed.

[21] Appl. No.: 157,913

[22] Filed: Feb. 19, 1988

[51] Int. Cl.$^4$ .............................................. A01K 1/015
[52] U.S. Cl. ........................................................ 119/1
[58] Field of Search .............................................. 119/1

[56] References Cited

U.S. PATENT DOCUMENTS 4,459,368  7/1984  Jaffee et al. .................... 119/1 X
4,676,196  6/1987  Lojek et al. ..................... 119/1

FOREIGN PATENT DOCUMENTS 109275  5/1984  European Pat. Off. ............... 119/1

Primary Examiner—Robert P. Swiatek

[57] ABSTRACT

An absorbent composition is disclosed which is particularly useful as an improved animal or pet litter composition, or as an absorbent for aqueous systems or oleophilic materials such as petroleum or vegetable oils and the like. Also disclosed is a method of making the improved absorbent composition and litter composition containing same. The absorbent composition is comprised of clay and a nitrogenous compound absorber, such as cyclodextrin or other agents which form a matrix system or complex similar to cyclodextrin. Such other agents include polymerized cyclodextrin and cyclodextrin derivatives and polycarboxylic acid polymers such as a acrylate polymers.

25 Claims, No Drawings

ABSORBENT COMPOSITION, AND METHOD OF MAKING SAME

BACKGROUND OF THE INVENTION

This application is a continuation-in-part application of copending U.S. Pat. No. application Ser. No. 103,927, filed Oct. 2, 1987.

Field of the Invention

This invention relates to an absorbent composition useful as an absorbent for aqueous systems, including urine, particularly useful as an improved animal or pet litter composition, and useful as an absorbent for oleophilic materials such as petroleum or vegetable based oils and the like. The invention also relates to a method of making the improved absorbent composition and litter compositions containing same. The absorbent composition is comprised of clay and a nitrogenous compound absorber, such as cyclodextrin or other agents which form a matrix system or complex similar to cyclodextrin. Such other agents include polymerized cyclodextrin and cyclodextrin derivatives and polycarboxylic acid polymers such acrylate polymers.

DESCRIPTION OF RELATED ART

Many attempts have been made in the past to provide improved absorbent compositions which are acceptable for use in animal litters, particularly for domestic pets such as cats. Generally known litter compositions available today contain large amounts of clay and/or natural grass compositions. In addition to being useful as animal litter compositions, such compositions containin9 clays have also been suggested for use in absorbing oily materials commonly found in garage floors from automobiles. Such oleophilic or oily materials include the lubricating oils, kerosene, power steering fluids, transmission fluids and spills from gasoline and ethylene glycol antifreeze coolant compositions and spills of vegetable oils in food plants, such as when frying. Such compositions containing clays have not been entirely satisfactory and have been deficient in one or more of the characteristics and properties necessary as an effective absorbent, particularly for animal litter applications, where odor suppression or elimination is desirable.

The desirable characteristics of an absorbent composition for animal litters include:

(a) high absorptive ability, particularly water or high moisture absorbency;
(b) a reduced odor, particularly ammoniacal from urine waste products;
(c) lack of toxicity;
(d) low degree of dusting to avoid tracking;
(e) and low cost, economically available ingredients of the composition.

Natural grasses, such as alfalfa have been employed in the past with a clay for a binder. While such natural grasses may contain some odor suppressant ability as a result of any chlorophyl present therein, alfalfa has a strong odor itself, particularly when wet. Other materials have been tried along with the alfalfa employing grain or grass straw, such as described in U.S. Pat. No. 4,258,660, which employs clay as a binder for maintaining the ingredients in a pelletized form, rather than for its moisture absorptivity property.

Other materials have been suggested in the past as a replacement for alfalfa, such as peanut hulls in U.S. Pat. No. 4,217,858, having the characteristics of a lubricant and/or binder. Among those having binder characteristics are clays and lignin such as sodium bentonite. Among the lubricants mentioned is starch. Reference is also made in the patent to process corn cobs having been employed in the past.

In order to overcome odor problems, the use of fragrance releasing additives has been suggested as in U.S. Pat. No. 3,921,581, which incorporates consolidated particles having the property of fragrance release. The particles are composed of a minor amount of a perfume agent and major amount of a solid excipient of molded, finely divided or powdered solids of a binder and water sensitive disintegrant. The excipient may be all clay or include other finely divided cellulosic solids, such as sawdust, or chlorophyl containing solids, such as ground alfalfa. In addition to clays, the binder and water sensitive disintegrant may be water soluble or dispersible gums such as guar gum, microcrystalline cellulose or pregelantinized starch. The fragrance release composition is then blended with a porous expanded litter product prepared from equal parts by weight of ground alfalfa and gelatinized wheat flour.

In U.S. Pat. No. 3,059,615, an animal litter generally is described which is composed of acidic cellulosic materials which include dried grasses or hay, husks, sawdust, corn cob grits, excelsior and cereal hulls. The cellulosic materials are merely ground to a desirable size and sprayed with the acid solution.

Other patents generally dealing with alfalfa-based animal litter with various binders, either alone or admixed with other absorbent materials are described in U.S. Pat. Nos. 4,206,718; 3,923,005; 3,972,971; 3,789,797 and 3,983,842, which describes other prior patents in the litter area. Still other patents generally dealing with animal litters, including some containing clays as the major absorbent material such as U.S. Pat. Nos. 8,375,734; or further 4,407,231; 2,014,900; 4,386,580; 4,405,354; 4,424,763; 4,085,704; 3,916,831; 3,636,927; 4,157,696 and 4,341,180.

In our copending U.S. application Ser. No. 906966 filed Sept. 22, 1986 for Absorbent Composition, Method of Making and Using Same, there is disclosed an improved absorbent composition comprised of a cellulosic component, a binder and cyclodextrin as a nitrogenous compound absorber. This provides an effective animal litter product even without addition of a fragrance although the cyclodextrin is also an effective carrier for any desired added aromatic fragrance.

SUMMARY OF THE INVENTION

It has now been discovered that cyclodextrin, or materials or other agents which form a matrix system similar to cyclodextrin also forms an effective odor control with clay or soil based animal litter absorbent composition. Further, the compositions of this invention retain other desired advantages in that low cost materials are employed, which are non-toxic and which have a reduced odor, even when employed without added fragrance.

Broadly the absorbent composition comprises clay carrying a nitrogenous compound absorber such as cyclodextrin. This may be prepared by simple admixing of the cyclodextrin and the clay particles. The cyclodextrin will be present either as a surface coating or is incorporated internally into the clay base or substrate dependent on the method of preparation of the product. When prepared is a surface coating, a liquid dispersion of the cyclodextrin may be applied, i.e., by spraying an aqueous disperson of the cyclodextrin on to the clay particles. Optionally, an adhesive may be employed in order to ensure adherence of the cyclodextrin to the clay. In the surface coating method employing an adhesive the clay, after mixing, is crushed to an appropriate particle size and coated with a liquid application of an adhesive or binder followed by application of a dry, cyclodextrin powder which adheres to the clay through the adhesive applied.

In the above methods a kiln dried clay is generally employed. In the case where a clay is used resulting from a wet mining process the cyclodextrin is added to the resulting clay slurry or mud and the cyclodextrin is incorporated internally into the clay.

In this method incorporating the cyclodextrin internally into the clay, the clay is mixed in a slurry form containing water sometimes referred to as a "mud." The cyclodextrin is added to the mud product at the desired level. The clay slurry or mud containing the cyclodextrin is then dried or baked and subsequently crushed or broken into the appropriate particle size. In this method no adhesive is usually necessary.

Accordingly the invention concerns an absorbent composition particularly adapted for use as an animal litter comprised of clay and a nitrogenous compound absorber such as cyclodextrin or other agents having a matrix system similar to cyclodextrin. The invention also concerns methods of preparing such an absorbent composition.

DETAILED DESCRIPTION AND PREFERRED EMBODIMENTS

As noted briefly above, the major component of the absorbent composition of the present invention is clay or clay-like materials. Clay, as the term is used herein, is intended to encompass the usual aluminosilicate minerals, such as kaolinite, halloysite, attapulgite, montmorillonite, vermiculite hectorite and the like, as well as diatomaceous earth or Fuller's earth. Particularly desirable ore clays having water expanding crystal lattices, such as bentonite, i.e., montmorillonite, which is a preferred clay material, particularly in the method of preparation in which the cyclodextrin is incorporated internally when added to a clay mud. While not wishing to be limited thereto, it is believed that the matrix of the cyclodextrin in combination with the expanding crystal lattice of the clay material such as bentonite powder a particularly desirable and effective absorbent composition. However, diatomaceous earth and attapulgite are also commonly employed in animal litter and are desirable materials. Diatomaceous earth is generally available commercially as a kiln-dried material resulting from a mined product containing about 20% moisture. Montmorillonite is generally supplied as a rotary kiln-dried product resulting from a mined product containing about 35 to 40% moisture and is kiln dried commercially to a moisture content of about 8 to 9%. Thus the substantially dry clays will contain about 10 to 15% moisture with 10% or less being preferred.

Cyclodextrins are the preferred ingredient for control of odor as a nitrogenous compound absorber or selective entrapment agent. The cyclodextrins are cyclic oligosaccharides that contain at least six $\alpha$-1,4 linked D glucopyranose units. $\beta$-Cyclodextrin has 7 units, while $\alpha$ and $\gamma$ have 6 and 8 respectively. Cyclodextrins have the shape of a hollow truncated cone with primary and secondary hydroxy groups crowning opposite ends of the torus. The inside of the molecule provides an ability to admit various guest molecules into the inner cavity. The formation of an inclusion complex with the cyclodextrin will depend on the relative size and ionic nature of the guest molecule. While not wishing to be limited thereto, it is believed that nitrogenous compounds are absorbed as a guest molecule in the inner cavity of the cyclodextrin.

While cyclodextrin is the preferred material, other materials which form a matrix or complex similar to cyclodextrin may be employed in similar manner to act as the nitrogenous compound absorber. Compounds having a matrix, or forming a complex similar to cyclodextrin, include cyclodextrin derivatives and various polymers which are inert and non-toxic. Among the cyclodextrin derivatives which may be employed are cyclodextrin carbamates (such as shown in U.S. Patent 3459732) and the cyclodextrin polyol ether or polyethers (such as described in U.S. Pat. Nos. 3453259 and 3459731). Among suitable polymers are polymerized $\beta$-cyclodextrin which is available commercially from American Maize. Synthetic or plastic polymers may be employed. Illustrative of these polymers are acrylate polymers such as sold by Wickhen Products under the name POLYTRAPR®. One such product is POLYTRAP 603. These products are described by the supplier as fully thermoset crosslinked acrylate polymers which are non-toxic and capable of entrapping a fragrance. Some of the copolymers are specifically described as polyglycerol acrylate and polypropyl acrylate. The polymers are generally polycarboxylic polymers consisting of monomer units of acrylic acid or methacrylic acid. Generally the carboxyl groups are esterified at least in part. In particular the alkyl esters, i.e. methyl, ethyl, propyl and butyl, and the glycerol esters are preferred. Examples of macromolecular compounds which are partially structured of monomer units with a free carboxylic acid group are highly polymerized co-polymerizates of acrylic acid and/or methacrylic acid with acrylic or methacrylic acid esters. The polymerisates may be obtained in powder form as well as an aqueous dispersion. These acrylate co-polymers are capable of carrying more fragrance than cyclodextrin and are accordingly generally employed in a smaller amount. This property is also believed to provide for slow fragrance release where a fragrance is added to the composition. While addition of a fragrance is not necessary, users of animal litters have become accustomed to the use of fragrances in commercial animal litters, and accordingly, the addition of a fragrance, which does not materially affect the basic litter composition of cellulosic materials and binder, will generally be included in the composition. Fragrances employed are natural or synthetic aromatic volatile compounds generally employed as a fragrance by those skilled in the fragrance art.

The nitrogen absorbing compound or ingredient will be employed in an amount of up to about 2% by weight of the total litter composition, however, it is desirable not to exceed about 1%, and generally from 0.05 to about 0.5%, preferably about 0.1% is employed. In the present invention, since the clay comprises the major portion of the total composition, the cyclodextrin is present at about 0.1% by weight of the clay. Where a fragrance is employed, the cyclodextrin may carry a 10% fragrance load, which at a 1% level of cyclodextrin would provide about 0.1% fragrance based on total composition. At a 0.1% cyclodextrin level, the fragrance level will accordingly be about 0.01% of the total composition, which is the preferred level of fragrance where such is employed. Other ingredients used as nitrogenous absorbers or selective entrapment and fragrance release agents may load fragrance at a higher level than cyclodextrin. For example, polymer systems may be capable of loading as high as 60% fragrances. Thus, the acrylate copolymers noted above are capable of carrying about 6 times more fragrance than cyclodextrin and accordingly may be employed in about one-sixth the amount required when cyclodextrin, or a cyclodextrin derivative, is employed. It is however preferred that the fragrance level be maintained at a level of about 0.01% fragrance based on total composition and, accordingly, the amount of such polymer system will be adjusted to provide that level of fragrance. Where the fragrance is carried by the cyclodextrin it may be incorporated into the cyclodextrin before application of the cyclodextrin to the clay. However, fragrance or essence may be added by simple addition to the cyclodextrin-clay product during the bagging or packaging operation. Thus, periodic injections of the fragrance or essence is injected during the packaging operation of the dry litter absorbent composition which consists essentially of the clay and cyclodextrin.

Other materials may be added, which do not materially affect the basic composition such as bacteriostats, dyes, anti-fungal, disinfectants, expansion and anti-dusting agents and the like.

As indicated earlier, particularly in the method of preparation of a cyclodextrin surface coated clay product employing a dry powdered cyclodextrin, a liquid adhesive or binder is first applied to the clay so as to bind or adhere the cyclodextrin to the clay. These binders or adhesives may be applied in the form of aqueous solutions or dispersions of the adhesive or binder. When water is not desirable in the system, such as, when employing cyclodextrin which carries the fragrance, other liquids may be employed. The aqueous solutions employed will generally be solutions containing from 2.5 to 7% by weight of the adhesive. A 5% solution is generally preferred. The aqueous solution is applied at a rate so as to apply to the clay from about 0.25 to about 0.7% by weight of adhesive based on the clay, with about 0.5% preferred. Alternatively, the clay surface may be merely wetted with water, or other liquid and the cyclodextrin applied. Further a thin or dilute dispersion of a clay itself may be applied and function as a binder for the cyclodextrin.

The adhesive or binder include the water soluble or dispersible products such as the vegetable gums like the polygalactomannan gums, i.e. guar gum and locust bean being the most common. The binder may also be an alginate or xanthan gum, a pregelatinized starch such as pregelatinized cornstarch or microcrystalline cellulose polymers.

As indicated above the clay is the major or principal ingredient of the absorbent composition and accordingly the clay will comprise about 90%, and generally 95% or more by weight of the composition. When cyclodextrin is employed alone, or with fragrance, at the preferred level of about 0.1% the clay will accordingly comprise in excess of 99% by weight of the total composition, i.e., about 99.8 to 99.9%. When an adhesive or binder is employed the clay will comprise about 99 to 99.5%. Other absorbent materials may be employed in addition to the clay if desired. Such are known to those skilled in the art. When such are employed, however, the clay absorbent should be employed in a major amount not less than 50% by weight of the total absorbent composition. The process of preparing the absorbent composition may generally be described as comprising adding to an absorbent clay a nitrogenous compound absorber such as cyclodextrin in an amount of about 0.05 to 2% by weight, preferrably about 0.1%.

In one method the cyclodextrin is applied in the form of a dry powder after application to the clay of an adhesive or binder in liquid form, i.e., an aqueous solution. The clay has been previously crushed or ground to a size of about 2 to 7 mm. The aqueous adhesive solution is sprayed on the clay particles and subsequently tumbled with the dry, powdered cyclodextrin. In the examples to follow this will be referred to as Method A.

In a second method, the cyclodextrin is added to a clay slurry or mud after which the clay containing the cyclodextrin incorporated therein is dried and crushed or ground to the desired particle size of about 2 to 7 mm. This method will be referred to as Method B.

The preferred composition prepared in accord with Method A would be comprised as follows:

| | |
|---|---|
| Clay | about 99.5% |
| Adhesive | about 0.4% |
| Cyclodextrin | about 0.1% |

The preferred composition prepared by Method B would not have present the adhesive or binder would accordingly be comprised of about 99.9% clay and about 0.1% cyclodextrin. The same composition may be achieved by the simple admixing of dry cyclodextrin and dry clay particles in the amounts indicated, which may be referred to as Method C. In still another method, referred to as Method D, an aqueous dispersion of the cycldextrin is sprayed, or otherwise applied to the clay, to provide the amount of cyclodextrin indicated after which the product is dried and packaged.

Methods employing aqueous solutions should not be employed, or should be avoided, when a fragrance is carried by the cyclodextrin as the cyclodextrin may prematurely release the fragrance in the presence of water. In such a case other liquids may be employed in the solution or dispersion applications methods. Such other liquids would be glycols or alcohols such as propylene glycol; and glycerin or vegetable oils.

The preferred clays are the bentonite or montmorillonite clays, attapulgite and diatomaceous earth. The preferred adhesive are guar or locust bean gum, pregelatinzed starches or microcrystalline cellulose polymers.

The samples of the present invention have virtually no odor in the absence of fragrance. The fragrance employed will of course determine the type of odor. In use with urine samples, the samples of the absorbent composition of the present invention will entrap or absorb the nitrogenous compounds, when about 0.1% cyclodextrin is incorporated into the composition, and larger amounts of cyclodextrin appear unnecessary. If the cyclodextrin derivatives are employed in place of the cyclodextrin in the formulations noted, these are employed in amounts at about the same level as cyclodextrin. With the POLYTRAP acrylate polymers described earlier, as these can carry a higher load, the compounds are generally employed in a smaller amount, preferably on the order of 1% or less, i.e. 0.05% to 0.1%.

We claim:

1. In an absorbent composition comprised of clay as an absorbent material the improvement wherein said absorbent contains a nitrogenous compound absorber, said nitrogenous compound absorber being selected from the group consisting of cyclodextrin, cyclodextrin derivatives, polymerized cyclodextrin and polyacrylate compounds having a matrix system similar to cyclodextrin.

2. An absorbent composition as defined in claim 1 wherein said nitrogenous compound absorber is present in an amount of about 0.05 to 2% by weight.

3. An absorbent composition as defined in claim 2 wherein said nitrogenous compound absorber is polymerized cyclodextrin.

4. An absorbent composition as defined in claim 2 wherein said nitrogenous compound absorber is a polyacrylate polymer selected from the group consisting of polyglycerol acrylate and polypropyl acrylate.

5. An absorbent composition as defined in claim 1 wherein said nitrogenous compound absorber is cyclodextrin which is present in an amount of about 0.05 to about 0.5% by weight 6. An absorbent composition as defined in claim 5 wherein said cyclodextrin is present in about 0.1% by weight.

7. An absorbent composition as defined in claim 6 wherein said cyclodextrin contains up to a 10% by weight load of fragrance.

8. An absorbent composition as defined in claim 1 in which said clay comprises at least 90% by weight of the total absorbent composition.

9. An absorbent composition as defined in claim 8 in which said clay comprises about 99% by weight of the absorbent composition.

10. An absorbent composition as defined in claim 1 in which said nitrogenous compound absorber is coated on the clay and adhered thereto with an adhesive binder.

11. A method of preparing an absorbent composition useful as an animal litter having improved odor properties comprising adding to a clay absorbent material a nitrogenous compound absorber in an amount of between 0.05 to 2% by weight, said nitrogenous compound absorber being selected from the group consisting of cyclodextrin, cyclodextrin derivatives polymerized cyclodextrin and polyacrylate compounds having a matrix system similar to cyclodextrin.

12. A method as defined in claim 11 wherein an adhesive binder is applied to said clay in liquid form prior to the addition of said nitrogenous compound absorber.

13. A method as defined in claim 12 wherein said adhesive binder is applied in the form of an aqueous solution sprayed on clay particles having a particle size in the range of about 2 to about 7 mm and said nitrogenous compound absorber is cyclodextrin applied in the form of a dry powder which adheres to the clay through said adhesive binder.

14. A method as defined in claim 13 wherein said cyclodextrin is applied in an amount of about 0.1% by weight.

15. A method as defined in claim 14 in which said cyclodextrin carries an aromatic volatile fragrance.

16. A method as defined in claim 11 in which said nitrogenous compound absorber is cyclodextrin and is added to a mud of said clay and mixed with said clay mud so as to incorporate the cyclodextrin internally after which said mixture of clay and cyclodextrin is dried and ground to a particle size in the range of about 2 to about 7 mm.

17. A method as defined in claim 16 in which said cyclodextrin is added to said clay in an amount of about 0.05 to about 0.5% by weight.

18. A method as defined in claim 17 in which said cyclodextrin is added in an amount of about 0.1% by weight.

19. A method as defined in claim 11, wherein a dry cyclodextrin is added and mixed with a substantially dry clay.

20. A method as defined in claim 11, wherein said nitrogenous compound absorber is cyclodextrin and is applied as an aqueous dispersion to a substantially dry clay.

21. A method as defined in claim 20 wherein said aqueous dispersion of cyclodextrin is applied by spraying.

22. An animal litter having improved odor properties comprising an absorbent composition comprised of clay and a nitrogenous compound absorber, said absorbent composition having a particle size in the range of about 2 mm to about 7 mm, said nitrogenous compound absorber being selected from the group consisting of cyclodextrin, cyclodextrin derivatives, polymerized cyclodextrin and polyacrylate compounds having a matrix system similar to cyclodextrin.

23. An animal litter as defined in claim 22 in which said nitrogenous compound absorber is cyclodextrin present in an amount of about 0.05 to about 2% by weight.

24. An animal litter as defined in claim 23 in which said cyclodextrin is present in an amount of about 0.1% by weight.

25. An animal litter as defined in claim 23 in which said cyclodextrin carries an aromatic volatile fragrance.

* * * * *